(12) United States Patent
Takehara et al.

(10) Patent No.: US 8,115,340 B2
(45) Date of Patent: Feb. 14, 2012

(54) SYSTEM FOR CONTROLLING POWER FROM A PHOTOVOLTAIC ARRAY BY SELECTIVELY CONFIGURATING CONNECTIONS BETWEEN PHOTOVOLTAIC PANELS

(75) Inventors: Toru Takehara, Foster City, CA (US); Shinichi Takada, Fremont, CA (US)

(73) Assignee: PACECO Corp., Hayward, CA (US)

( * ) Notice: Subject to any disclaimer, the term of this patent is extended or adjusted under 35 U.S.C. 154(b) by 496 days.

(21) Appl. No.: 12/352,510

(22) Filed: Jan. 12, 2009

(65) Prior Publication Data
US 2010/0147354 A1 Jun. 17, 2010

Related U.S. Application Data

(60) Provisional application No. 61/122,311, filed on Dec. 12, 2008.

(51) Int. Cl.
*H01L 31/042* (2006.01)
(52) U.S. Cl. ............................................. 307/71; 307/77
(58) Field of Classification Search .................... 307/71, 307/82–84, 77, 78; 136/293
See application file for complete search history.

(56) References Cited

U.S. PATENT DOCUMENTS

| 5,449,959 A * | 9/1995 | Yang ................................ 307/81 |
| 6,350,944 B1 * | 2/2002 | Sherif et al. ................... 136/244 |
| 6,583,522 B1 * | 6/2003 | McNulty et al. ................ 307/71 |
| 2001/0048356 A1 | 12/2001 | Owen |

* cited by examiner

*Primary Examiner* — Fritz M Fleming
(74) *Attorney, Agent, or Firm* — GSS Law Group

(57) ABSTRACT

A system for maximizing power output from a photovoltaic array includes a configurable photovoltaic panel having a series-parallel selector and a bypass selector electrically controlled by a node controller. Some embodiments further include a plurality of configurable photovoltaic modules. A configurable photovoltaic panel may selectively be electrically connected to other configurable photovoltaic panels in a series circuit, a parallel circuit, or a combination of series and parallel circuits according to switching states set by the node controller for the bypass selector and series-parallel selector. A number of configurable photovoltaic panels connected in series and a number connected in parallel may optionally be selected in response to a change in an output voltage from a photovoltaic array, for example a voltage change resulting from a change in illumination, thereby causing the output voltage from the photovoltaic array to be greater than or equal to a minimum input voltage for an inverter.

16 Claims, 8 Drawing Sheets

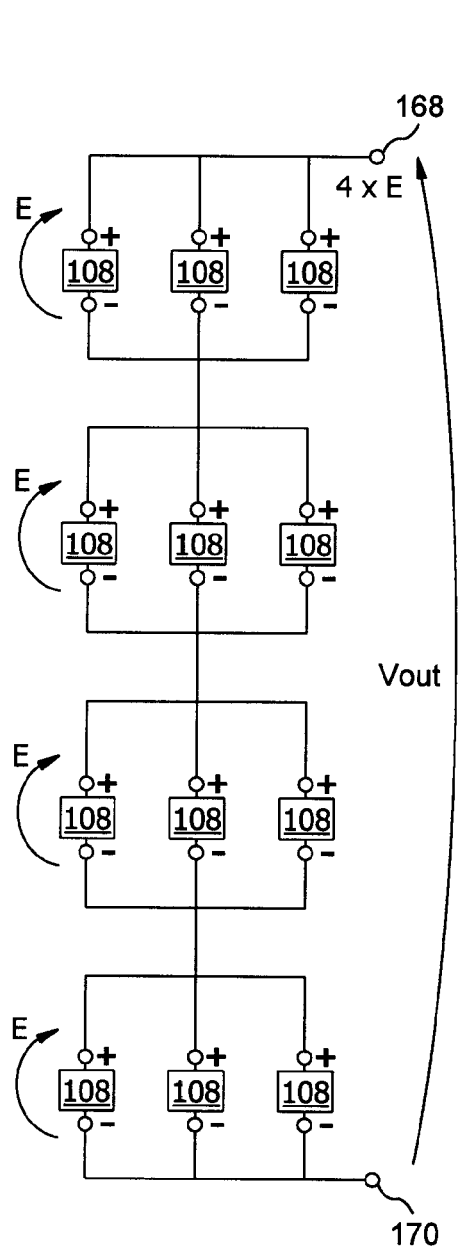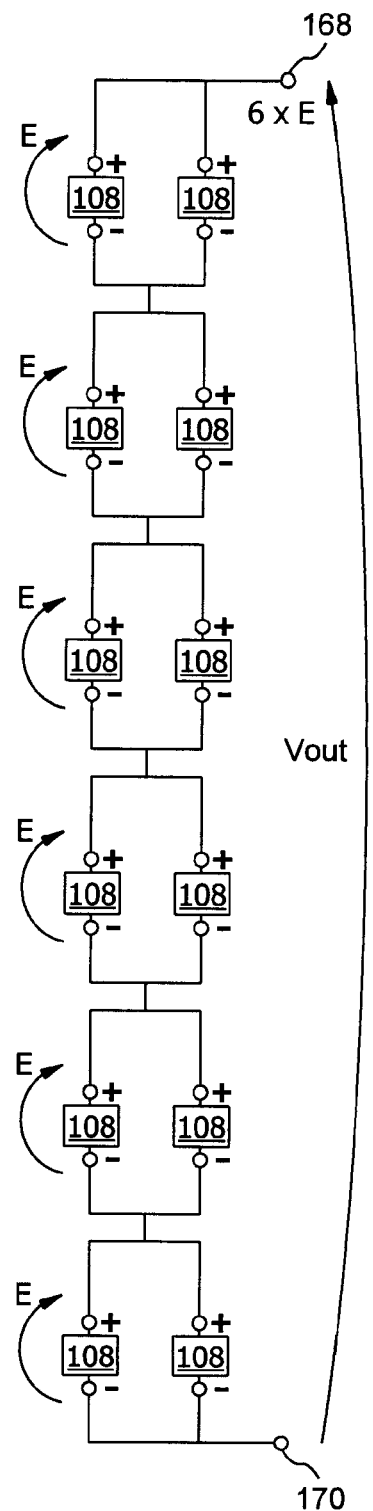
Fig. 9
Fig. 10

SYSTEM FOR CONTROLLING POWER FROM A PHOTOVOLTAIC ARRAY BY SELECTIVELY CONFIGURATING CONNECTIONS BETWEEN PHOTOVOLTAIC PANELS

CROSS REFERENCE TO RELATED APPLICATIONS

This application claims the benefit of U.S. Provisional Application No. 61/122,311, filed Dec. 12 2008.

FIELD OF THE INVENTION

The present invention relates generally to a system for controlling an amount of power output from a photovoltaic array and more specifically to a configurable photovoltaic panel adapted to selectively connect to other configurable photovoltaic panels with series electrical connections, parallel electrical connections, or a combination of series and parallel electrical connections.

BACKGROUND

A photovoltaic (PV) power generation system for supplying electricity to an electric power grid includes an array of PV panels and an inverter. A PV array may include just a few PV panels, for example a PV power generation system for supplying electric power to a residence or small commercial establishment, or may have many thousands of panels as in a utility-scale PV array. The voltage and current output from each of the PV panels in the PV array are combined in an electrical circuit and input to the direct current (DC) input of the inverter, which converts the combined DC electrical power from the PV panels into alternating current (AC) electrical power output having an AC voltage suitable for connection to the electric power grid. DC output voltage from the PV array, corresponding to DC input voltage to the inverter, must be within a specified DC input voltage range for the inverter's AC output voltage to be within an acceptable range for connection to the electric power grid.

A reduction in DC output voltage from one or more PV panels in a PV array may cause voltage at the DC input to the inverter to be lower than the inverter's specified minimum DC input voltage, causing a related reduction in the inverter's AC output voltage. A system operator or automatic control system may therefore choose to exclude the power output from a PV panel with low DC output voltage from the inverter input in order for other PV panels with sufficiently high output voltage to maintain a desired output voltage from the inverter, at the expense of reducing the total amount of electrical power produced by the PV array. As the number of PV panels with low output voltage increases, for example when cloud shadows move across the PV array or when the sun sets, the number of PV panels contributing an acceptable magnitude of input voltage to the inverter decreases, and power output from the PV array decreases. For a PV array comprising PV panels known in the art, it is eventually necessary to isolate the PV array from the inverter input rather than output AC power at too low a voltage for supplying the electric power grid, even though the PV array is still generating some electrical power.

In addition to reductions in incident radiation from cloud shadows and the daily motion of the sun, PV panel output voltage may also be reduced by, for example, dirt or water on the panel surface, airborne obstructions to solar radiation such as precipitation, smoke, smog, and dust, and shadows from nearby trees or buildings. PV panel voltage also decreases when solar cells in the panel are subjected to high temperatures. Aging effects or an electrical fault within a PV panel may also contribute to a reduction in output voltage. A properly functioning PV panel outputs electrical power as long as a sufficient amount of illumination is incident upon the panel, but as the incident illumination decreases, the output voltage also decreases. PV panel output power with insufficient voltage for coupling into an inverter represents lost power and reduced power generating efficiency.

What is needed is a system for reconfiguring electrical connections between PV panels in a PV array to control electrical power produced under conditions of reduced illumination. What is further needed is a system for reconfiguring electrical connections between PV panels so that a magnitude of DC electrical voltage at a power output from a PV array is greater than or equal to the minimum DC input voltage for an inverter.

SUMMARY

Embodiments of the invention include a configurable photovoltaic (PV) panel which is selectively configurable for series electrical connections, parallel electrical connections, or mixed series and parallel electrical connections with other configurable PV panels in a PV array. Some embodiments include a plurality of configurable PV panels electrically interconnected to form a PV array. A number of configurable PV panels electrically connected in parallel and a number of configurable PV panels electrically connected in series may optionally be selected to cause an output voltage from the PV array to be greater than a minimum input voltage for an inverter. The numbers of configurable PV panels electrically connected in series and in parallel in the PV array may further be adaptively chosen in response to parameters related to a decrease in illumination incident on the PV array.

A configurable PV panel in accord with an embodiment of the invention includes a PV module, an electrically controlled bypass selector, an electrically controlled series-parallel selector, a node controller, an electrical connector for communicating control and monitoring signals with the node controller, and input and output electrical connectors for electrical power. DC voltage and current present on the first power connector is electrically coupled to the second power connector. DC voltage and current from the PV module is selectively excluded from the voltage and current on the first power connector according to a selected switching state for the bypass selector. DC voltage and current output from the PV module is selectively coupled to voltage and current from PV modules on adjacent PV panels in the PV array in a series electrical connection, a parallel electrical connection, or a combination of series and parallel electrical connections according to a selected switching state of the series-parallel selector.

The node controller monitors parameters related to PV module performance and controls the switching states of the bypass switch and series-parallel switch in response to signals received on the control and monitoring connector. Alternatively, in some embodiments the node controller autonomously changes switching states of the series-parallel switch in response to changes in measured parameters. The node controller optionally outputs data related to performance of the PV module and the switching states of the bypass switch and the series-parallel switch on the control and monitoring connector.

This section summarizes some features of the present invention. These and other features, aspects, and advantages of the embodiments of the invention will become better understood with regard to the following description and upon reference to the following drawings, wherein:

BRIEF DESCRIPTION OF THE DRAWINGS

FIG. 9 shows an equivalent electrical circuit for an alternative electrical configuration for the embodiment of FIG. 5, comprising a combination of series and parallel electrical connections between configurable PV panels having a PV array output voltage of "4×E" volts.

FIG. 10 shows an equivalent electrical circuit for an alternative electrical configuration for the embodiment of FIG. 5, comprising a combination of series and parallel electrical connections between configurable PV panels having a PV array output voltage of "6×E" volts.

DESCRIPTION

Embodiments of the invention include a configurable photovoltaic (PV) panel selectively configurable for series electrical connections, parallel electrical connections, or a combination of series and parallel electrical connections with other configurable PV panels in a PV array. Some embodiments further include a plurality of electrically interconnected configurable PV panels. A plurality of electrically connected configurable PV panels is referred to herein as a PV array. A configurable PV panel in accord with an embodiment enables an output voltage from a PV array to be increased in response to a decrease in an amount of illumination incident on the PV array. Embodiments of the invention are beneficial for controlling electric power output from a PV array and for recovering an amount of photovoltaically generated electric power that would be wasted in a PV array comprising PV panels known in the art. Embodiments of the invention are further beneficial for maximizing an amount of power from a PV array in which some of the configurable PV panels in the PV array are electrically disconnected from the PV array for reasons of maintenance, for example to clean a PV panel or to repair a damaged or malfunctioning PV panel.

Figure 1:
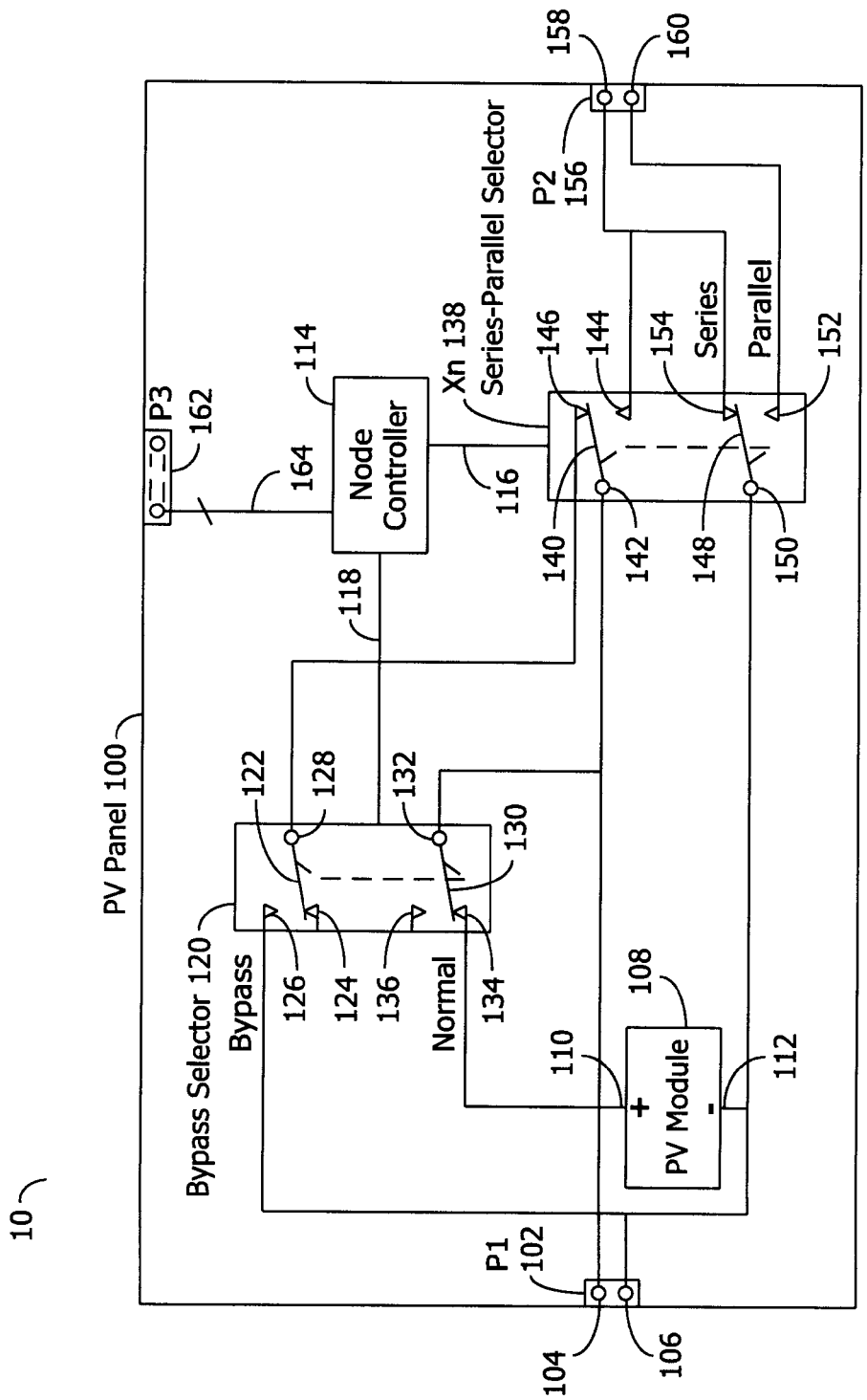
FIG. 1 is a circuit diagram of an example of a configurable photovoltaic (PV) panel in accord with an embodiment of the invention.

A circuit diagram for an example of a PV panel in accord with an embodiment of the invention is shown in FIG. 1. The embodiment 10 of FIG. 1 includes a configurable PV panel 100 having a PV module 108 for generating electrical power from solar radiation incident on the PV module, a node controller 114 for monitoring and controlling the PV panel 100, and an electrically controlled bypass selector 120 for selectively excluding current and voltage output from the PV module 108 from current and voltage on a first power connector P1 102. The configurable PV panel 100 of FIG. 1 further includes a second power connector P2 156 and an electrically controlled series-parallel selector Xn 138 for selectively connecting to other configurable PV panels 100 with series electrical connections, parallel electrical connections, or a combination of series and parallel electrical connections.

The node controller 114 in FIG. 1 monitors parameters related to the performance of the PV module 108 and the PV panel 100 and sets a switching state of the bypass selector 120 and a separate switching state of the series-parallel selector Xn 138. Examples of parameters monitored by the node controller include, but are not limited to, output current and output voltage from the PV module 108, temperatures measured at different selected positions on the PV module 108, azimuth and elevation angles of the PV panel 100, current and voltage input to the PV panel on the second power connector P2 156, and current and voltage output from the PV panel 100 on first power connector P1 102. The node controller 114 may optionally be configured to detect electrical fault conditions within the PV module 108 or the PV panel 100, partial shading of the PV module 108, reductions in electrical power from precipitation, dust, or debris on a surface of the PV module 108, and reductions in incident radiation from dust, precipitation, or cloud cover. Data related to monitored parameters is optionally output from the node controller 114 on a monitor and control connector P3 162 electrically connected to the node controller 114 by a plurality of electrical conductors comprising a control and monitoring signal input/output bus 164. Output data on connector P3 162 may optionally be received by other configurable PV panels 100 in a PV array or by an external monitoring and control system.

Switching states for the electrically controlled bypass selector 120 and the electrically controlled series-parallel selector Xn 138 determine how current and voltage output from the PV module 108 is combined with electrical power flowing through the first and second power connectors P1 102 and P2 156. As shown in FIG. 1, the bypass selector 120 and the series-parallel selector Xn 138 are double-pole, double-throw (DPDT) electromechanical relays. Either one or both of the selectors (120, 138) may alternatively be replaced by a solid state relay or solid state switching devices made from discrete electronic components. Either selector (120, 138) may optionally be changed from a single DPDT electrically controlled switching device to a pair of single-pole, single-throw switching devices sharing a common control line electrically connected to the node controller 114.

Referring to FIG. 1, electric power from other PV panels in a PV array may optionally be connected to the PV panel 100 on the second power connector P2 156 comprising a first terminal 158 and a second terminal 160. Voltage and current on the P2 first terminal 158 and the P2 second terminal 160 are selectively combined with voltage and current output from the PV module 108 according to selected switching states for the bypass selector 120 and the series-parallel selector Xn 138 as will be explained later. The P2 first terminal 158 is electrically connected to a parallel terminal 144 of a first S-P switch 140 in the series-parallel selector Xn 138. The P2 first terminal 158 is further electrically connected to a series terminal 154 of a second S-P switch 148 in the series-parallel selector Xn 138. The P2 second terminal 160 is electrically connected to a parallel terminal 152 of the second S-P switch 148.

A series terminal 146 of the first S-P switch 140 is electrically connected to a common terminal 128 for a first bypass switch 122 in the bypass selector 120. A common terminal 142 of the first S-P switch 140 is electrically connected to a common terminal 132 for a second bypass switch 130 in the bypass selector 120. The common terminal 142 of the first S-P switch 140 is further connected electrically to a connector P1 first terminal 104. A common terminal 150 of the second S-P switch 148 is electrically connected to a negative terminal 112 on the PV module 108, to a connector P1 second terminal 106, and to a bypass terminal 126 of the first bypass switch 122 in the bypass selector 120.

Continuing with FIG. 1, a positive terminal 110 of the PV module 108 is connected electrically to a normal terminal 134 of the second bypass switch 130 in the bypass selector 120. A bypass selector control line 118 carries control signals from the node controller 114 to a control input of the bypass selector 120. A first control signal from the node controller 114 on the bypass selector control line 118 sets the bypass selector 120 to a "Bypass" switching state in which output from the PV module 108 is excluded from the voltage and current on the terminals of the first power connector P1 102. A "Bypass" switching state is also referred to herein as a "B" switching state. A second control signal from the node controller 114 on the bypass selector control line 118 sets the bypass selector 120 to a "Normal" switching state in which output from the PV module 108 is selectively combined with the voltage and current on the terminals of the connector P1 102 according to one of two alternate switching states for the series-parallel selector Xn 138. A "Normal" switching state is also referred to herein as an "N" switching state. In the example of FIG. 1, the first bypass switch 122 and the second bypass switch 130 in the bypass selector 120 are shown in the "Normal" switching state. FIG. 1 further shows the first bypass switch 122 normal terminal 124 and the second bypass switch 130 bypass terminal 136 as unterminated. One skilled in the art will appreciate that passive components may optionally be electrically connected to the unterminated terminals to reduce an amount of noise coupled into the circuit.

A series-parallel selector control line 116 carries control signals from the node controller 114 to a control input of the series-parallel selector Xn 138. A third control signal from the node controller 114 on the series-parallel selector control line 116 sets the series-parallel selector Xn 138 to a "Series" switching state, also referred to herein as an "S" switching state. A fourth control signal from the node controller 114 on the series-parallel selector control line 116 sets the series-parallel selector Xn 138 to a "Parallel" switching state, also referred to herein as a "P" switching state. In the example of FIG. 1, the first S-P switch 140 and the second S-P switch 148 in the series-parallel selector Xn 138 are shown in the "Series" switching state.

Figure 2:
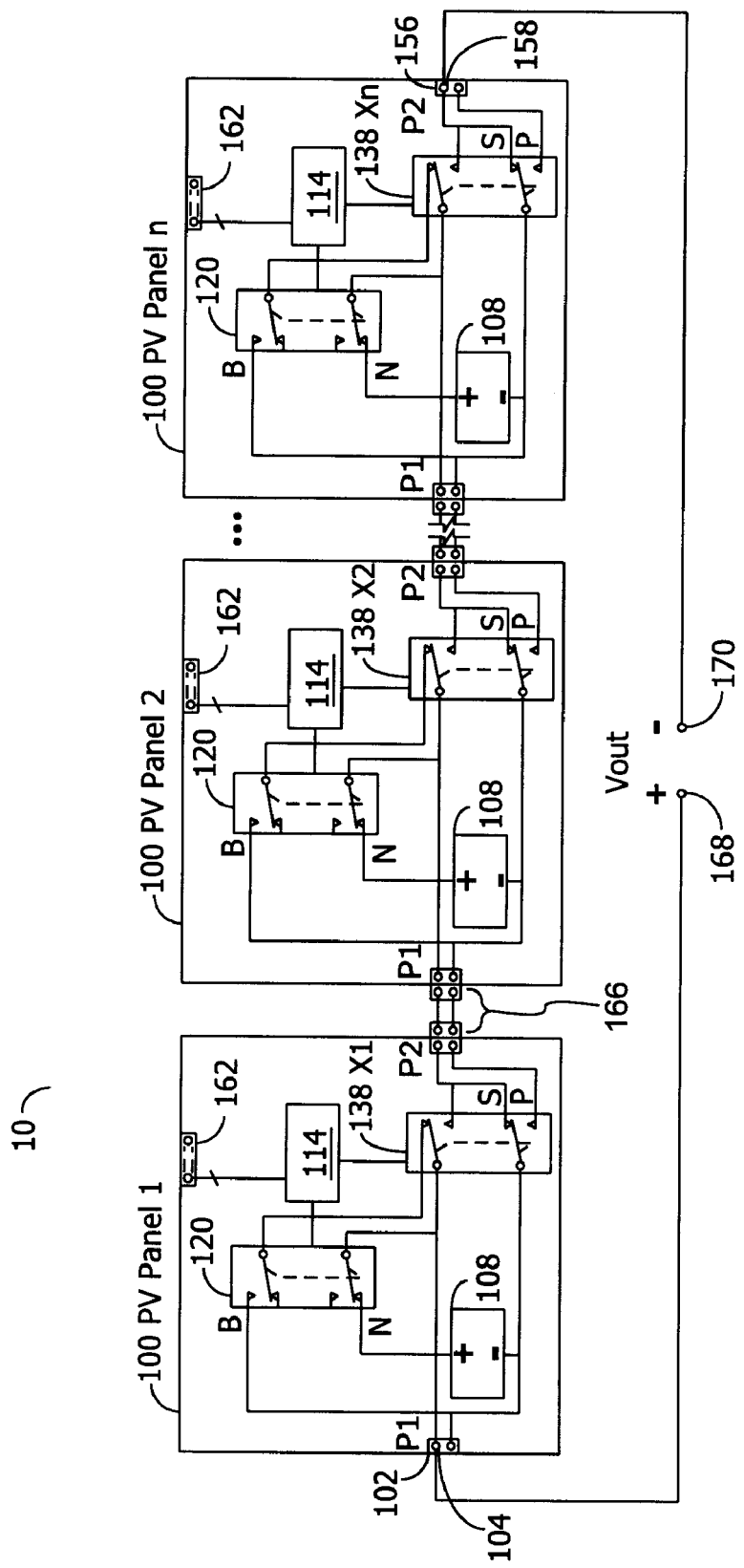
FIG. 2 is a circuit diagram of an example of another embodiment comprising a PV array having an integer number "n" of the configurable PV panels of FIG. 1, interconnected with cable assemblies to form a series electrical circuit.

A photovoltaic power generating system includes a PV array having a plurality of PV panels. FIG. 2 illustrates an example of an embodiment 10 having an integer number "n" of configurable PV panels 100 electrically connected by cable assemblies 166 in a series electrical configuration. As shown in FIG. 2, series-parallel selectors (138 X1, 138 X2, . . . 138 Xn) are shown in an "S" switching state. All of the bypass selectors 120 in the "n" number of panels are set to an "N" switching state in the example of FIG. 2. An output voltage Vout from the PV array, measured from a PV array negative output terminal 170 to a PV array positive output terminal 168, is the sum of the output voltages of the "n" PV modules. In the configuration shown in FIG. 2, an output voltage for the embodiment 10 further corresponds to the PV array output voltage Vout measured from a connector P2 terminal 1 158 in PV panel number "n" to a connector P1 terminal 1 104 in PV panel number 1. In the case of a PV panel having the series-parallel selector set to the "S" state and the bypass selector 120 set to the "B" state, output voltage from the PV panel's PV module is excluded from the output voltage Vout by a circuit path in the PV panel around the PV module between the first power connector P1 and the second power connector P2.

Figure 3:
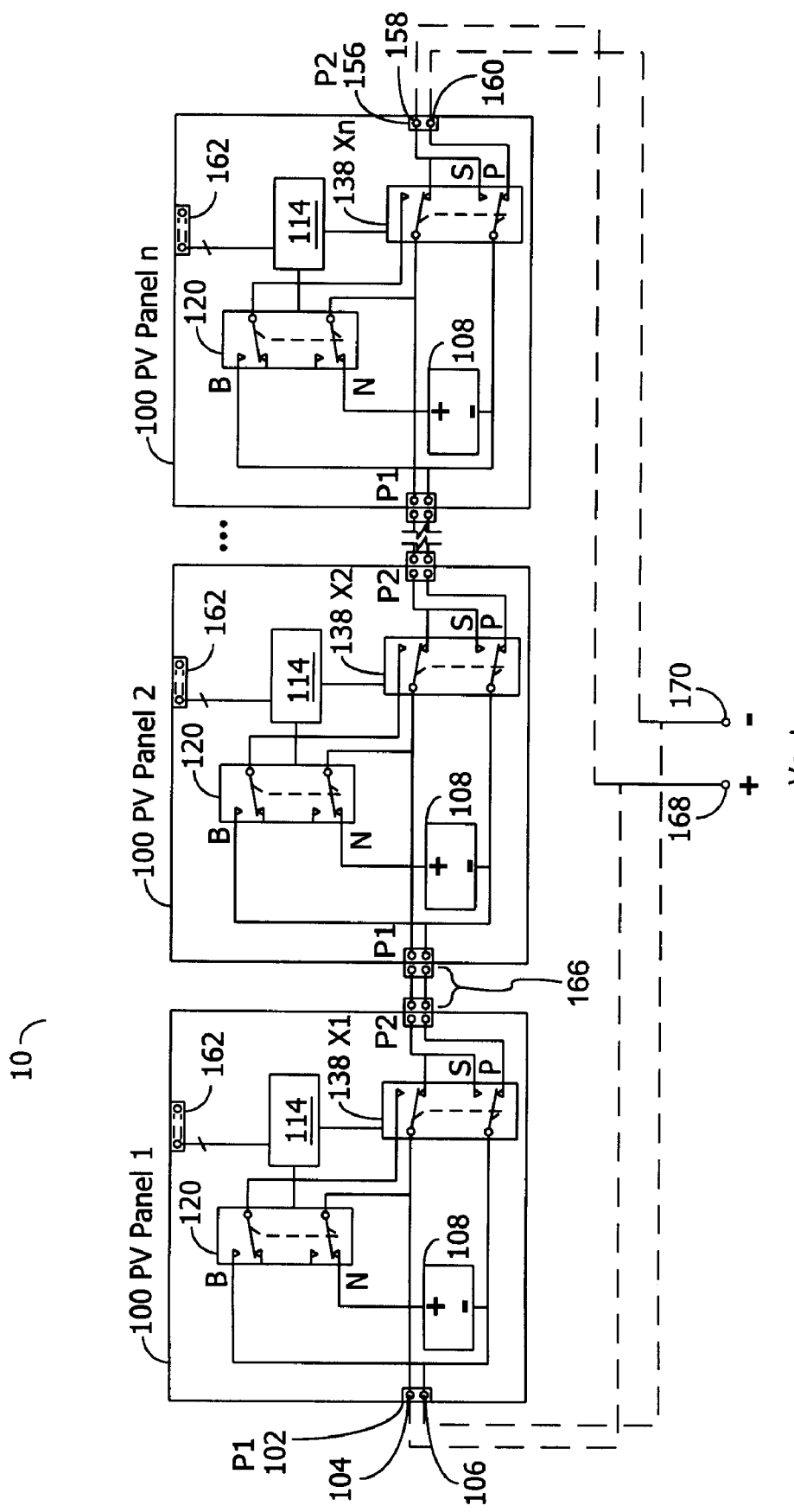
FIG. 3 is an alternative electrical configuration for the embodiment of FIG. 2 in which the configurable PV panels have been changed from series electrical connections to parallel electrical connections by selected settings for an electrically controllable series-parallel selector in each PV panel.

FIG. 3 illustrates one of many alternative electrical configurations for the "n" number of PV panels electrically connected to form a PV array in the embodiment 10 of FIG. 2. In FIG. 3, an integer number "n" of PV panels 100 are electrically interconnected by cable assemblies 166 in a parallel electrical configuration with series-parallel selectors (138 X1, 138 X2, . . . 138 Xn) in a "P" switching state. Bypass selectors 120 are shown in an "N" switching state. An output voltage Vout from the PV array, measured from a PV array negative output terminal 170 to a PV array positive output terminal 168, is equal to an output voltage from any one of the PV panels 100 all of which, for purposes of this example, have equal output voltages. In the case of configurable PV panels having different output voltages, a PV array output voltage may be calculated by conventional methods for analyzing parallel electrical circuits. An output current from the PV array example of FIG. 3 is equal to the arithmetic sum of the current output from each of the "n" number of panels, an optional current input to connector P1 on PV panel 100 number 1, and an optional current input to connector P2 on PV panel 100 number "n". PV array negative output terminal 170 may alternately be electrically connected to connector P2 terminal 2 160 on PV panel 100 number n or to connector P1 terminal 2 106 on PV panel 100 number 1, as indicated by dashed connection lines in FIG. 3. PV array positive output terminal 168 may alternately be electrically connected to connector P1 terminal 1 104 on panel number 1 or to connector P2 terminal 1 158 on panel number n, as indicated by dashed connection lines in FIG. 3.

The parallel configuration shown in FIG. 3 has the advantage of generating the maximum amount of PV array output current for a given level of illumination. However, in the case where an output voltage from one or more of the PV panels in the example of FIG. 3 decreases, for example from a shadow falling across the PV modules on the PV panels, the output voltage of the entire PV array decreases. As PV array output voltage Vout decreases in response to decreasing illumination, the output voltage eventually falls below the minimum input voltage specification for an inverter, and any further power produced by the array can not be coupled to an electric power grid through the inverter, that is, the power generated is wasted power.

Selectively connecting some PV panels in series and others in parallel increases the output voltage from a PV array compared to a PV array with only parallel connections between PV panels. By connecting the minimum number of PV panels in series to make a PV array output voltage that is greater than the inverter minimum input voltage, current output from the array is maximized under conditions of reduced illumination. An increasing number of PV panels may selectively be electrically connected in series in response to falling illumination levels, for example as the sun sets or a thick cloud layer gradually blocks sunlight incident on a PV array, until all panels in the array are connected in series and the maximum possible PV array output voltage is produced.

Figure 4:
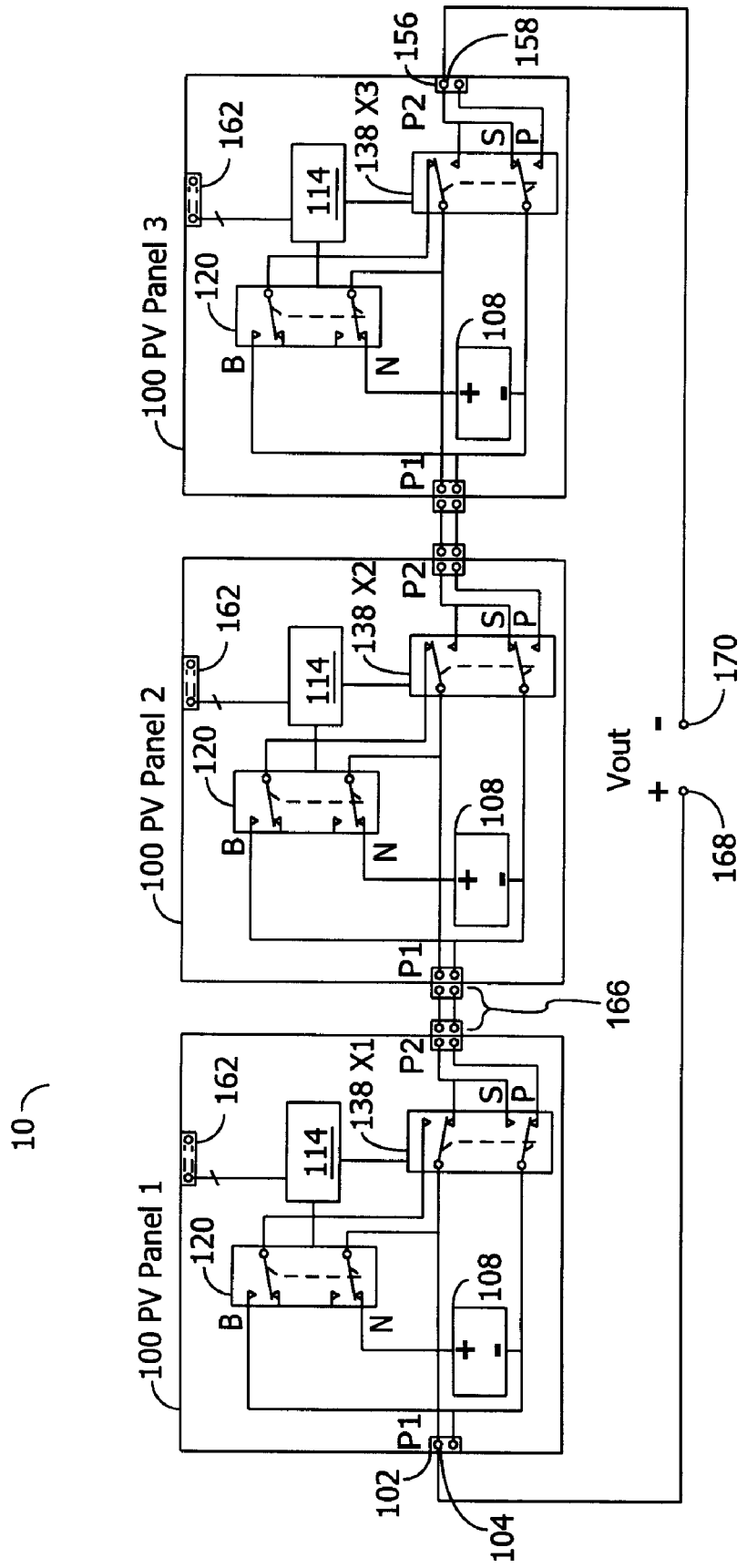
FIG. 4 shows an example of a PV array comprising three configurable PV panels interconnected with series and parallel electrical connections.

FIG. 4 shows an example of an embodiment 10 including three PV panels connected in a combination of series and parallel electrical connections. In the example of FIG. 4, PV panel 100 number 1 has a series-parallel selector 138 X1 set to a "P" switching state. The series-parallel selector 138 X2 in PV Panel 100 number 2 is in an "S" switching state, and PV panel number 3 has a series-parallel selector 138 X3 set to an "S" switching state. A PV array output voltage Vout measured between the PV array positive output terminal 168 and the PV array negative output terminal 170 in FIG. 4 is approximately twice the PV array output voltage for PV panels connected in parallel as shown in the example of FIG. 3. A PV array configured as in FIG. 4 will therefore produce an output voltage that is greater than or equal to the minimum input voltage for an inverter under lower levels of illumination than the PV array example of FIG. 3. A PV array having selectable series and parallel connections between PV panels, as in the example of FIG. 4, captures electrical power for output to an electric power grid under conditions in which PV panels interconnected only in parallel output power at too low a voltage for connection to an inverter input.

Figure 5:
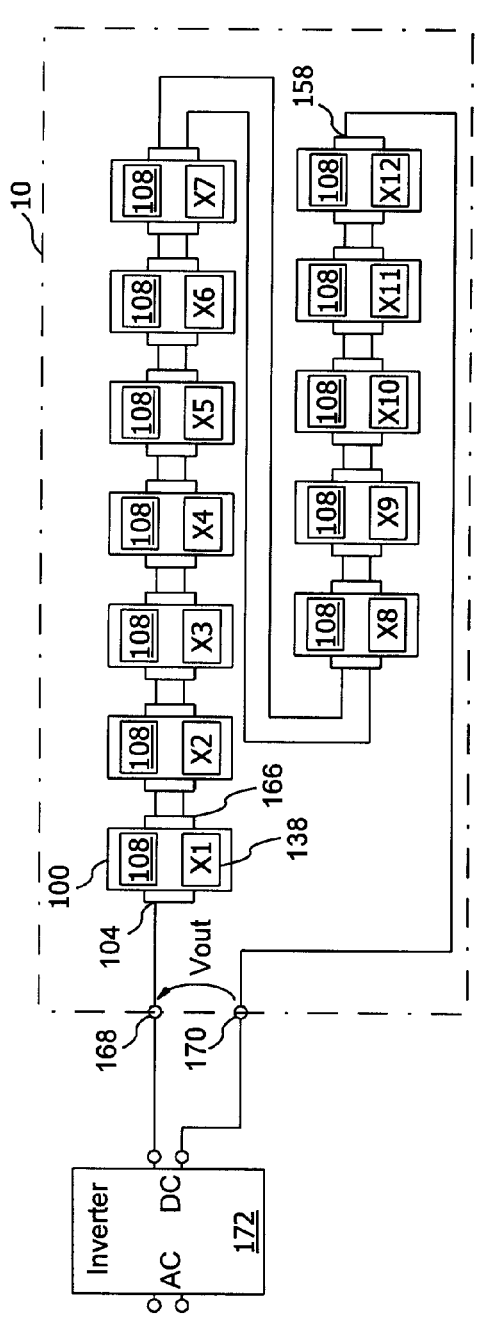
FIG. 5 shows an example of an embodiment of the invention comprising twelve configurable PV panels electrically interconnected by cable assemblies to form a PV array. Each of the configurable PV panels in FIG. 5 includes a PV module and an electrically controlled series-parallel selector according to the embodiment of FIG. 1. The embodiment of FIG. 5 may be selectively configured as in any of the examples of FIG. 6-11 according to settings chosen for series-parallel selectors X1-X12.

The embodiment of FIG. 5 may be used to illustrate examples of combinations of series and parallel electrical connections and corresponding PV array output voltages produced by a PV array having twelve configurable PV panels. The example of an embodiment 10 of FIG. 5 includes twelve configurable PV panels, each in accord with the embodiment of FIG. 1 and electrically interconnected in a PV array by cable assemblies 166. An output voltage Vout from the PV array is measured across a PV array positive output terminal 168 and a PV array negative output terminal 170. Connector P1 terminal 1 104 on PV panel 100 number 1 is electrically connected to PV array 10 positive output terminal 168, which is further electrically connected to a first DC input on an inverter 172. Connector P2 terminal 1 158 on PV panel 100 number 12 is electrically connected to PV array 10 negative output terminal 170, which is further electrically connected to a second DC input on the inverter 172. Each of the PV panels 100 represented in simplified form in FIG. 5 includes a PV module 108 and a series-parallel selector (X1, X2, X3, ... X12).

Figure 6:
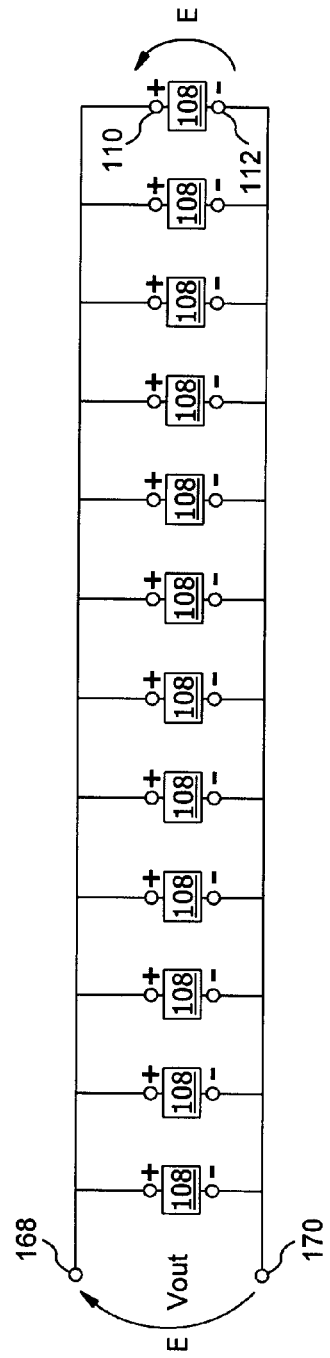
FIG. 6 illustrates a simplified equivalent electrical circuit for one of several selectable electrical configurations for the PV array example of FIG. 5. In the example of FIG. 6, all of the configurable PV panels in the PV array are interconnected in a parallel electrical circuit having a PV array output voltage of "E" volts.

In a first alternative configuration illustrated in the simplified equivalent electrical circuit of FIG. 6, the twelve PV panels of the embodiment of FIG. 5, represented in FIG. 6 by PV modules 108, are connected in a parallel electrical circuit. An output voltage from a PV module 108, measured across a positive terminal 110 and a negative terminal 112, is represented by a voltage "E". For the parallel electrical configuration of FIG. 6, corresponding to a "P" switching state selected for all twelve series-parallel selectors (X1-X12), the output voltage Vout of the PV array, measured across the first and second output terminals (168, 170) is equal to "E".

Table 1 summarizes the switching states for the twelve series-parallel selectors in the examples of FIG. 5-11.

TABLE 1

"S" and "P" switching states corresponding to PV array output voltage Vout.

| FIG. | X1 | X2 | X3 | X4 | X5 | X6 | X7 | X8 | X9 | X10 | X11 | X12 | Vout |
|---|---|---|---|---|---|---|---|---|---|---|---|---|---|
| 6 | P | P | P | P | P | P | P | P | P | P | P | P | E |
| 7 | P | P | P | P | P | S | P | P | P | P | P | S | 2E |
| 8 | P | P | P | S | P | P | P | S | P | P | P | S | 3E |
| 9 | P | P | S | P | P | S | P | P | S | P | P | S | 4E |
| 10 | P | S | P | S | P | S | P | S | P | S | P | S | 6E |
| 11 | S | S | S | S | S | S | S | S | S | S | S | S | 12E |

Figure 7:
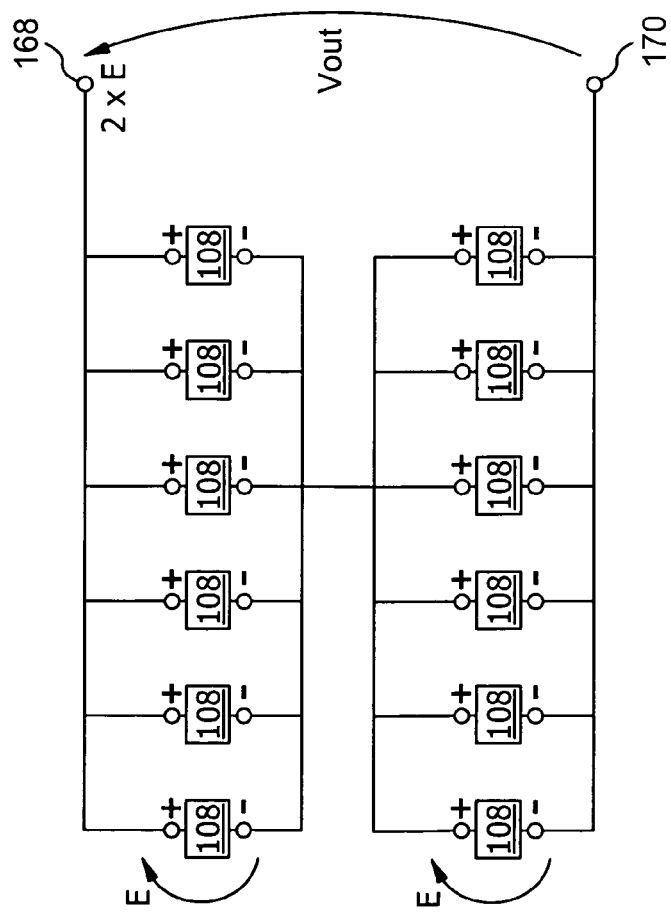
FIG. 7 shows an equivalent electrical circuit for an alternative electrical configuration for the embodiment of FIG. 5, comprising a combination of series and parallel electrical connections between configurable PV panels having a PV array output voltage of "2×E" volts.

FIGS. 7-11 illustrate more alternative electrical configurations for the example embodiment of FIG. 5. FIG. 7 shows an equivalent electrical circuit for two series-connected groups with six configurable PV panels connected in parallel in each group. The PV array configuration of FIG. 7 has an output voltage across the first and second PV array output terminals (168, 170) of 2×E, where "E" is defined as for FIG. 6. Switch states for the twelve series-parallel selectors in the PV array are shown in Table 1.

Figure 8:
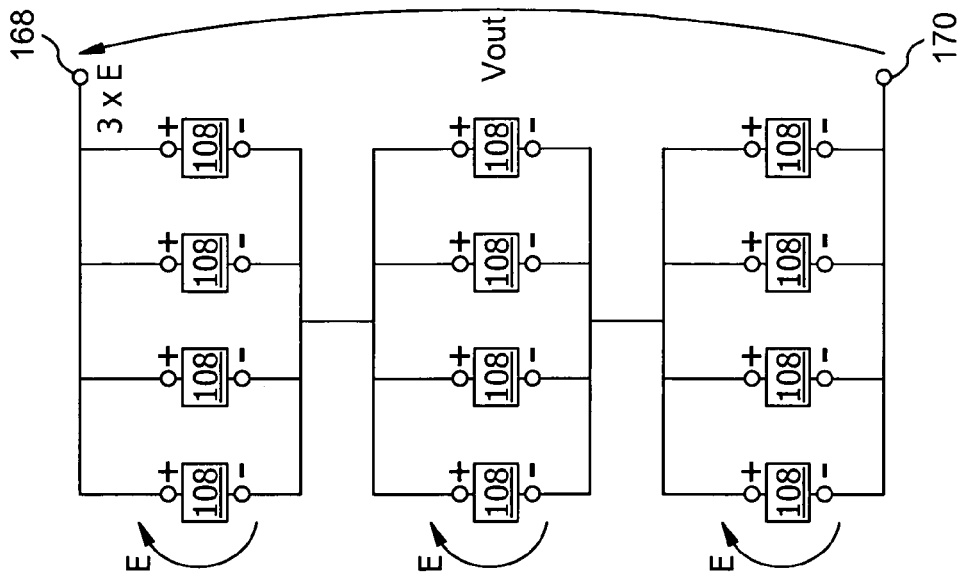
FIG. 8 shows an equivalent electrical circuit for an alternative electrical configuration for the embodiment of FIG. 5, comprising a combination of series and parallel electrical connections between configurable PV panels having a PV array output voltage of "3×E" volts.
Figure 11:
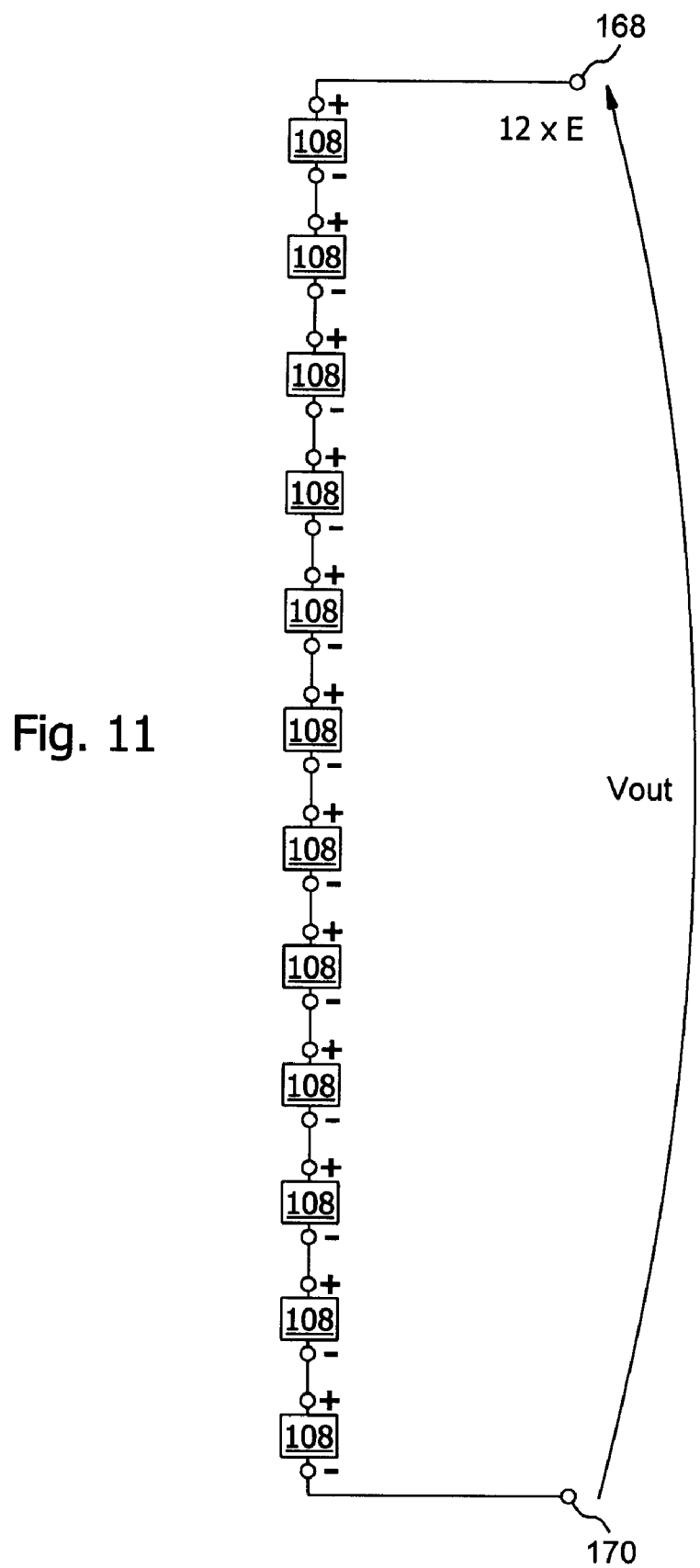
FIG. 11 shows an equivalent electrical circuit for an alternative electrical configuration for the embodiment of FIG. 5. In the example of FIG. 11, all of the configurable PV panels in the PV array are interconnected in a series electrical circuit having a PV array output voltage of "12×E" volts.

FIG. 8 shows an equivalent electrical circuit for three series-connected groups with four configurable PV panels connected in parallel per group and a PV array output voltage Vout equal to 3×E. FIG. 9 shows four series-connected groups having three configurable PV panels in parallel per group and a PV array output voltage of 4×E. A PV array output voltage Vout equal to 6×E is achieved by the configuration illustrated in FIG. 10, which shows six series-connected groups, each group having two configurable PV panels in parallel. Lastly, FIG. 11 shows a configuration having the maximum value of PV array output voltage. In FIG. 11, all twelve configurable PV panels are connected in a series electrical combination.

Other configurations not shown in the examples of FIGS. 6-10 may also be selected for the PV array example of FIG. 5. For example, a selected integer number "j" of PV panels may be electrically connected in series, with a remaining integer number "k" of PV panels from the PV array arranged in an integer number "x" groups of an integer number "y" of parallel-connected PV panels each. Alternatively, different groups of parallel-connected PV panels may have different numbers of PV panels per group.

The examples of FIGS. 5 to 11 may be extended to very large PV arrays comprising many hundreds or even many thousands of panels. In some very large arrays, an inverter having a high value for minimum DC input voltage is preferred. For example, in one example of a grid-connected inverter known in the art, the minimum DC input voltage is approximately fifteen times the voltage output from a single PV panel. That is, at least fifteen PV panels are electrically connected in series to generate an output voltage large enough to input to the inverter. In such a case, a PV array has many series-connected chains of PV panels with the chains of panels further connected in parallel to one another and to the inputs of an inverter. Embodiments of the invention are suitable for use in very large PV arrays comprising a plurality of series-connected chains of configurable PV panels in a parallel electrical circuit. Operation of an embodiment in a large array may be compared to the operation in the examples described previously herein by substituting a series-connected chain of configurable PV panels for a single panel in an example. For example, each of the configurable PV panels in the examples of FIGS. 6-11, represented in the figures by a PV module 108, would be replaced by a series-connected chain of configurable PV panels to model the behavior of a very large number of PV panels in a PV array supplying power to an inverter with a high minimum input voltage.

Unless expressly stated otherwise herein, ordinary terms have their corresponding ordinary meanings within the respective contexts of their presentations, and ordinary terms of art have their corresponding regular meanings.

What is claimed is:

1. A system comprising a configurable photovoltaic (PV) panel comprising:
    a PV module having a positive terminal and a negative terminal;
    a series-parallel selector comprising:
        a first S-P switch comprising a first S-P switch series terminal, a first S-P switch parallel terminal, and a first S-P switch common terminal; and
        a second S-P switch comprising a second S-P switch series terminal electrically connected to said first S-P switch parallel terminal, a second S-P switch parallel terminal, and a second S-P switch common terminal;
    a bypass selector comprising:
        a first bypass switch comprising:
            a first bypass switch bypass terminal electrically connected to said PV module negative terminal and to said second S-P switch common terminal;
            a first bypass switch normal terminal; and
            a first bypass switch common terminal electrically connected to said first S-P switch series terminal;
        a second bypass switch comprising:
            a second bypass switch bypass terminal;
            a second bypass switch normal terminal electrically connected to said PV module positive terminal; and
            a second bypass switch common terminal electrically connected to said first S-P switch common terminal;
    a first power connector comprising:
        a first power connector first terminal electrically connected to said second bypass switch common terminal; and
        a first power connector second terminal electrically connected to said first bypass switch bypass terminal;
    a second power connector comprising:
        a second power connector first terminal electrically connected to said first S-P switch parallel terminal; and
        a second power connector second terminal electrically connected to said second S-P switch parallel terminal; and
    a node controller electrically connected to said series-parallel selector and to said bypass connector.

2. The system of claim 1, wherein said PV module is connected in a series electrical circuit with said first power connector first terminal and said second power connector first terminal when said second bypass switch common terminal is electrically connected to said second bypass switch normal terminal by said second bypass switch and said second S-P switch series terminal is electrically connected to said second S-P switch common terminal by said second S-P switch.

3. The system of claim 1, wherein said PV module is connected in a parallel electrical circuit with said first power connector first terminal and said first power connector second terminal and also with said second power connector first terminal and said second power connector second terminal when said second bypass switch common terminal is electrically connected to said second bypass switch normal terminal by said second bypass switch, said first S-P switch common terminal is electrically connected to said first S-P switch parallel terminal by said first S-P switch, and said second S-P switch common terminal is electrically connected to said second S-P switch parallel terminal by said second S-P switch.

4. The system of claim 1, wherein a voltage output and a current output of said PV module are electrically combined with a voltage and a current on said first power connector when said node controller causes said first bypass switch common terminal to electrically connect to said first bypass switch normal terminal.

5. The system of claim 1, wherein a voltage output and a current output of said PV module are electrically isolated from a voltage and a current on said first power connector when said node controller causes said first bypass switch common terminal to electrically connect to said first bypass switch bypass terminal and further causes said second bypass switch common terminal to electrically connect to said second bypass switch bypass terminal.

6. The system of claim 1, wherein said node controller further comprises:
    a bypass selector control line electrically connected to said node controller and to said bypass selector;
    a series-parallel selector control line electrically connected to said node controller and to said series-parallel selector;
    a control and monitoring input/output connector; and
    a control and monitoring input/output bus forming a plurality of electrical connections between said node controller and said control and monitoring input/output connector.

7. The system of claim 6, wherein said node controller is adapted to receive commands for changing a switching state of said bypass selector and commands for changing a switching state of said series-parallel selector on said control and monitoring input/output connector.

8. The system of claim 1, wherein said node controller is adapted to autonomously change a switching state of said bypass selector and said series-parallel selector.

9. The system of claim 1, further comprising a plurality of configurable PV panels electrically connected in an electrical circuit, forming thereby a PV array.

10. The system of claim 9, wherein said plurality of configurable PV panels are selectably electrically connected in a series electrical circuit.

11. The system of claim 9, wherein said plurality of configurable PV panels are selectably electrically connected in a parallel electrical circuit.

12. The system of claim 9, wherein said plurality of configurable PV panels are selectably electrically connected in a combination of series and parallel electrical circuits.

13. The system of claim 12, wherein a number of configurable PV panels electrically connected in series and another number of configurable PV panels electrically connected in parallel are selected to cause an output voltage from the said PV array to be greater than or equal to an input voltage specification for an inverter.

14. The system of claim 12, wherein a number of configurable PV panels electrically connected in series and another number of configurable PV panels electrically connected in parallel are selected to maximize an amount of power output from said PV array.

15. The system of claim 12, wherein a number of configurable PV panels electrically connected in series and another number of configurable PV panels electrically connected in parallel are selected in response to a change in an amount of illumination incident on said configurable PV panels.

16. The system of claim 12, wherein a number of configurable PV panels electrically connected in series and another number of configurable PV panels electrically connected in parallel are selected in response to selected configurable PV panels being electrically isolated for purposes of maintenance.

* * * * *